UNITED STATES PATENT OFFICE 2,518,512

1-DICARBALKOXYMETHYLENE-2-ALKYL-1,2-DIHYDROISOQUINOLINES AND METHOD OF PRODUCING THEM

Frank L. White and Leslie G. S. Brooker, Rochester, N. Y., assignors to Eastman Kodak Company, Rochester, N. Y., a corporation of New Jersey No Drawing. Application April 19, 1946, Serial No. 663,620

12 Claims. (Cl. 260—287)

This invention relates to 1-dicarbalkoxymethylene-2-alkyl-1,2-dihydroisoquinolines and to a process for the preparation thereof.

Mills and Smith, J. Chem. Soc. 1922, 121, 2724 prepared 1-methylisoquinoline by dehydrating ω-acetylaminophenylmethyl carbinol, and further prepared the methiodide of 1-methylisoquinoline. This method of preparing the methiodide of 1-methylisoquinoline leaves much to be desired, however, since the yield of 1-methylisoquinoline obtained by dehydrating the aforesaid carbinol is not high.

We have now found that 1-dicarbalkoxymethylene-2-alkyl-1,2-dihydroisoquinolines can be prepared by condensing 1-alkylmercaptoisoquinoline alkyl quaternary salts with malonic esters, and that the resulting 1-dicarbalkoxymethylene-2-alkyl-1,2-dihydroisoquinolines can be hydrolyzed to give 1-methylisoquinoline alkyl quaternary salts in substantial yields.

It is, accordingly, an object of our invention to provide 1-dicarbalkoxymethylene-2-alkyl-1,2-dihydroisoquinolines and a process for preparing the same. A further object is to provide a process for preparing 1-methylisoquinoline alkyl quaternary salts. Other objects will become apparent hereinafter.

In accordance with our invention we prepare 1-dicarbalkoxymethylene-2-alkyl-1,2-dihydroisoquinolines which can be represented by the following general formula:

I.

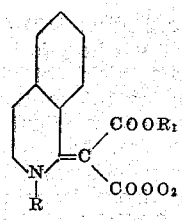

wherein R, $R_1$ and $R_2$ each represent an alkyl group, i. e. an alcohol radical, e. g. a methyl, an ethyl, an n-propyl, an n-butyl, an iso-butyl, an allyl, a β-methoxyethyl, a β-hydroxyethyl, a β-acetoxyethyl, a β-acetylethyl, a benzyl, a β-phenylethyl group, etc., by condensing a 1-alkylmercaptoisoquinoline alkyl quaternary salt which can be represented by the following general formula:

wherein R has the values given above, $R_3$ represents an alkyl group, i. e. an alcohol radical such as set forth above under Formula I, and X represents an anion, e. g. chloride, bromide, iodide, methylsulfate, ethylsulfate, p-toluenesulfonate, benzenesulfonate, acetate, perchlorate, thiocyanate, etc., with a malonic ester which can be represented by the following general formula:

III. 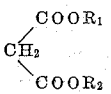

wherein $R_1$ and $R_2$ have the values given above. Advantageously compounds of Formulas I, II and III are employed wherein the alkyl groups are primary alkyl groups of the formula $C_nH_{2n+1}$ wherein $n$ represents a positive integer of from 1 to 4.

The condensations are advantageously effected in the presence of an acid-binding agent (basic condensing agent) which is advantageously a tertiary organic amine, e. g. trimethylamine, triethylamine, triisopropylamine, tri-n-propylamine, triisobutylamine, tri-n-butylamine, triethanolamine, tripropanolamine, N-methylpiperidine, N-ethylpiperidine, i. e. a tertiary organic amine which has an ionization constant greater than $10^{-5}$ at 25° C.

Advantageously the condensations are effected in a diluent. Alcohols which are liquid at 20° C. are advantageously employed as the diluent, especially alcohols of the formula $C_nH_{2n+1}OH$ wherein $n$ represents a positive integer of from 1 to 4. Heat accelerates the condensations.

The following example will serve to illustrate further the manner of obtaining 1-dicarbalkoxymethylene-2-alkyl-1,2-dihydroisoquinolines:

*Example 1.—1-dicarbethoxymethylene-2-methyl-1,2-dihydroisoquinoline*

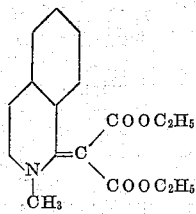

A mixture of 14.55 g. (1 mol.) of 2-methyl-1(2)-thioisoquinoline and 15.5 g. (1 mol.) of methyl-p-toluenesulfonate were heated together at the temperature of the steam bath for 6 hours. To the resulting 1-methylthioisoquinoline metho-p-toluenesulfonate were added 19.95 g. (1 mol.+50% excess) of diethyl malonate, 35 cc. of ethyl alcohol and 8.83 g. (1 mol.+5% excess) of triethylamine. The resulting mixture was heated at the refluxing temperature for 30 minutes. The cooled reaction mixture was then stirred with 250 cc. of diethyl ether. The ether mixture was chilled overnight at 0° C., and the solid which was present was then collected on a filter and washed with diethyl ether. The washed solid was then stirred, in a beaker, with hot methyl acetate. The methyl acetate mixture was chilled at 0° C., and the solid washed onto a filter with methyl acetate. The yield of 1 - (dicarbethoxymethylene) - 2 - methyl - 1,2 - dihydroisoquinoline at this point was 59% and can be used without further purification. A portion of the product was twice recrystallized from a mixture of equal volumes of ethyl alcohol and methyl acetate, and gave orange crystals, melting at 189–191° C. with decomposition.

In the same manner 1-dicarbethoxymethylene-2-ethyl-1,2-dihydroisoquinoline can be prepared by using 15.2 g. of 2-ethyl-1(2)-thioisoquinolone instead of 14.55 g. of 2-methyl-1(2)-thioisoquinolone; 1-dicarbethoxymethylene-2-n-propyl-1,2-dihydroisoquinolone can be prepared using 16.9 g. of 2-n-propyl-1(2)-thioisoquinolone; 1-dicarbethoxymethylene-2- isobutyl - 1,2-dihydroisoquinoline can be prepared using 18 g. of 2-isobutyl-1(2)-thioisoquinolone; 1-dicarbethoxymethylene-2-benzyl-1,2-dihydroisoquinoline can be prepared using 18.7 g. of 2-benzyl-1(2) - thioisoquinolone; 1-dicarbethoxymethylene-2 - allyl-1,2-dihydroisoquinoline can be prepared using 16.7 g. of 2-allyl-1(2)-thioisoquinolone; 1-dicarbethoxymethylene-2-β-hydroxyethyl- 1,2 - dihydroisoquinoline can be prepared using 17 g. of 2-β-hydroxyethyl-1(2)-thioisoquinolone, etc. 1-dicarbmethoxymethylene-2 - methyl-1,2 - dihydroisoquinoline can be prepared, employing 16.3 g. of dimethylmalonate instead of 19.95 g. of diethyl malonate; 1-dicarbpropoxymethylene-2-methyl-1,2-dihydroisoquinoline can be prepared using 23.5 g. of di-n-propylmalonate; 1-dicarbisobutyroxymethylene-2-methyl-1,2-dihydroisoquinoline can be prepared using 27 g. of diisobutylmalonate, etc.

The 2-methyl-1(2)-thioisoquinolone employed in the foregoing example can be prepared as shown in the following example:

*Example 2.—2-methyl-1(2)-thioisoquinolone*

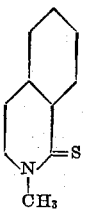

A mixture of 31.8 g. (1 mol.) of 2-methyl-1(2)-isoquinolone and 44.4 g. (1 mol.) of phosphorous pentasulfide in 75 cc. of pyridine was heated at the refluxing temperature for one hour. The reaction mixture was chilled and stirred with 500 cc. of cold water and then allowed to stand overnight at 0° C. The solid material was then collected on a filter and washed with cold water. The washed solid, while still moist, was extracted with two portions of boiling ligroin (B. P. 90 to 120° C.), 400 cc. and 240 cc. respectively. The 2-methyl-1(2)-thioisoquinolone which separated from each of the cooled extracts was filtered off, and then recrystallized from ligroin (B. P. 90 to 120° C.) again to give cream colored crystals, melting at 113 to 115° C. In like manner 2-ethyl-1(2)-thioisoquinolone was prepared from 2-ethyl-1(2)-isoquinolone. The brownish crystals recrystallized from ligroin melted at 114 to 115° C. and after washing with acetone became cream colored and melted at 118 to 119° C. In the same manner 2-n-propyl-1(2)-thioisoquinoline can be prepared using 37.4 g. of 2-n-propyl-1(2)-isoquinolone instead of 31.8 g. of 2-methyl-1(2) - isoquinolone; 2-isobutyl - 1(2) - thioisoquinolone can be prepared using 40.2 g. of 2-isobutyl-1(2)-isoquinolone; 2-allyl-1(2)-thioisoquinoline can be prepared using 37 g. of 2-allyl-1(2) - isoquinolone; 2 - β - hydroxyethyl-1(2)-thioisoquinolone can be prepared using 37.8 g. of β-hydroxyethyl - 1(2) - isoquinolone; 2-benzyl-1(2)-thioisoquinolone can be prepared using 47 g. of 2-benzyl-1(2)-isoquinolone, etc.

The 2-methyl-1(2)-isoquinolone employed in the foregoing example is described by Fisher and Hamer, J. Chem. Soc. 1934, 1905. It can be prepared as shown in the following example:

*Example 3.—2-methyl-1(2)-isoquinolone*

129 g. (1 mol.) of freshly distilled isoquinoline warmed on a steam bath, and 186 g. (1 mol.) of methyl-p-toluenesulfonate were added gradually with shaking. After addition of the methyl-p-toluenesulfonate, the mixture was heated for one hour. The resulting quaternary salt was dissolved in water, and the solution was chilled in an ice-water bath. 724 g. (2 mols. +10% excess) of potassium ferricyanide were dissolved in 2 l. of warm water and a solution of 264 g. (4 mols.) of 85% potassium hydroxide in 150 cc. of water were added to the ferricyanide solution. After chilling the potassium-hydroxide-ferricyanide solution to about 10° C., the cold aqueous solution of the quaternary salt was added gradually to the potassium-hydroxide-ferricyanide solution, with mechanical stirring, and continued cooling, so that the temperature of the reaction mixture did not rise above about 12° C. The reaction mixture was then stirred for about one hour, and it was then left standing at about 0° C. for a further hour. The 2-methyl-1(2)-isoquinolone was extracted from the reaction mixture with benzene. The benzene extract was washed with water and the benzene removed by distillation at atmospheric pressure. The residue was distilled at reduced pressure whereupon 67 g. of 2-methyl-1(2)-isoquinolone boiling at 194 to 200° C. at 25 mm. of Hg pressure were obtained.

In like manner 2-ethyl-1(2)-isoquinolone was prepared from 283 g. of crude isoquinoline ethoethylsulfate. The yield of 2-ethyl-1(2)-isoquinolone, boiling at 180 to 190° C. at 20 mm. of Hg pressure, was 80 g. Similarly 2-n-propyl-1(2)-isoquinolone can be prepared from isoquinoline n-propo-p-toluenesulfonate; 2-n-butyl-1(2)-isoquinolone from isoquinoline n-buto-p-toluenesulfonate; 2-allyl-1(2)-isoquinoline can be prepared from isoquinoline alliodide; 2-β-hydroxyethyl-1(2)-isoquinolone can be prepared from isoquinoline β-hydroxyethobromide; 2-benzyl-1(2)-isoquinolone can be prepared from isoquinoline benzobromide; etc. The isoquinoline alko-p-toluenesulfonates or alko-alkylsulfates are advantageously employed where available, because of their greater water solubility.

In Example 1, 2-methyl-1(2)-thioisoquinolone can be converted into a 1-alkylmercaptoisoquinoline alkyl quaternary salt by heating with ethyl, n-propyl or n-butyl-p-toluenesulfonate instead of methyl-p-toluenesulfonate. Likewise ethyl, n-propyl- and n-butyl-p-toluenesulfonate can be heated with any of the aforesaid 2-alkyl-1(2)-thioisoquinolones to give 1-alkylmercaptoisoquinoline alkyl quaternary salts. Similarly the 2-alkyl-1(2)-thioisoquinolones can be heated with dimethyl sulfate, diethyl-sulfate, allyl bromide, n-propyl iodide, benzyl bromide, β-methoxyethyl bromide, β-hydroxyethyl bromide, etc. to give 1-alkylmercaptoisoquinoline alkyl quaternary salts. The 1-alkylmercaptoisoquinoline alkyl quaternary iodides can be converted to perchlorates by treating a hot methyl alcoholic solution of the iodide with a hot aqueous solution of sodium perchlorate, and to the acetates by heating a methyl alcoholic suspension of the iodide with silver acetate, filtering of the silver salts and separating the alkyl quaternary acetate from the resulting solution.

The 1 - dicarbalkoxymethylene-2-alkyl-1,2-dihydroisoquinolines of our invention can be hydrolyzed to give excellent yields of 1-methylisoquinoline alkyl quaternary salts. The hydrolysis is carried out in the presence of an acid, advantageously hydrochloric acid, hydrobromic acid, sulfuric acid or phosphoric acid. Heat accelerates the hydrolysis. The more water-soluble 1-methylisoquinoline alkyl quaternary salts obtained in accordance with our invention, e. g. the 1-methylisoquinoline alkochlorides, can be converted into less soluble quaternary salts by treating an aqueous or alcoholic solution of the 1-methylisoquinoline alkochlorides with an aqueous or alcoholic solution of an alkali metal (e. g. sodium or potassium) perchlorate, iodide, etc.

The following examples will serve to illustrate further the manner of obtaining 1-methylisoquinoline alkyl quaternary salts by means of our new process:

*Example 4.—1-methylisoquinoline methiodide*

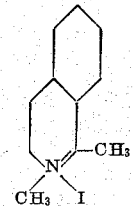

A mixture of 28.4 g. of 1-dicarbethoxymethylene-2-methyl-1,2-dihydroisoquinoline and 1500 cc. of concentrated hydrochloric acid (sp. g. 1.12) was heated over a free flame at such a rate that carbon dioxide was evolved freely. The flame was increased and near the end of the evolution of carbon dioxide, the mixture was heated at the refluxing temperature. The total time of heating was 75 minutes. The reaction mixture was concentrated to dryness, under reduced pressure, and the residue of 1-methylisoquinoline methochloride (20 g.) was dissolved in hot ethyl alcohol. To this hot solution was added a hot solution of 15 g. of sodium iodide in ethyl alcohol. The resulting hot suspension was filtered. The hot filtrate (about 270 cc.) was chilled at 0° C. The 1-methylisoquinoline methiodide which separated was filtered off and washed with acetone. The cream colored crystals weighed 22 g. and were further purified by recrystallizing from ethyl alcohol.

*Example 5.—1-methylisoquinoline ethiodide*

A mixture of 18.9 g. (1 mol.) of 2-ethyl-1(2)-thioisoquinolone and 20 g. (1 mol.) of ethyl-p-toluenesulfonate were heated together at the temperature of the steam bath for 24 hours. To this crude quaternary salt were added 24 g. (1 mol.+50% excess) of diethyl malonate, 50 cc. of ethyl alcohol and 10.6 g. (1 mol.+5% excess) of triethylamine, and the reaction mixture was heated at the refluxing temperature for 30 minutes. The reaction mixture was concentrated on the steam bath, under reduced pressure, until no more distillate came over. The residue of 1-dicarbethoxymethylene - 2 - ethyl-1,2-dihydroisoquinoline was dissolved in 100 cc. of concentrated hydrochloric acid (sp. g. 1.12), and this solution was heated over a free flame at such a rate that carbon dioxide was evolved freely. The flame was increased and near the end of the evolution of carbon dioxide, the mixture was refluxed. The total time of heating was 90 minutes. The mixture was then evaporated to dryness, under reduced pressure, and the residue of 1-methylisoquinoline methochloride was dissolved in hot ethyl alcohol, and a hot solution of 15 g. of sodium iodide in ethyl alcohol was added. The hot suspension was filtered to remove sodium chloride and the sodium chloride on the filter was washed with ethyl alcohol. The combined filtrate and washings were chilled to 0° C. and the 1-methylisoquinoline ethiodide which separated was collected on a filter and washed with acetone. The acetone-washed product was extracted with hot ethyl alcohol and the extract was concentrated to 220 cc. and then chilled to 0° C. The cream colored crystals which separated weighed 13 g. and melted at 215 to 216° C.

In a similar manner 1-methylisoquinoline n-propiodide can be prepared from 1-dicarbethoxymethylene-2-n-propyl - 1,2-dihydroisoquinoline; 1-methylisoquinoline n-butiodide can be prepared from 1-dicarbethoxymethylene-2-n-butyl-1,2-dihydroisoquinoline; 1-methylisoquinoline β-hydroxyethiodide can be prepared from 1-dicarbethoxymethylene - 2-β-hydroxyethyl - 1,2 - dihydroisoquinoline; 1-methylisoquinoline benziodide can be prepared from 1-dicarbethoxymethylene-2-benzyl-1,2-dihydroisoquinoline, etc.

The 1-methylisoquinoline alkyl quaternary salts obtainable by our new process can be condensed with cyclammonium quaternary salts containing a β-arylaminovinyl group to give carbocyanine dyes, and with other substances to give other kinds of methine dyes. See our copending application Serial No. 663,619, filed of even date herewith.

What we claim as our invention and desire to be secured by Letters Patent of the United States is:

1. The 1-dicarbalkoxymethylene-2-alkyl-1,2-dihydroisoquinolines which are represented by the following general formula:

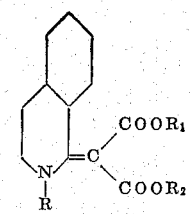

wherein R, $R_1$ and $R_2$ each represents an alkyl group.

2. The 1 - dicarbalkoxymethylene-2-alkyl-1,2-dihydroisoquinolines which are represented by the following general formula:

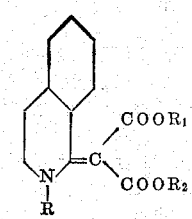

wherein R, R₁ and R₂ each represents a primary alkyl group of the formula $C_nH_{2n+1}$ wherein $n$ represents a positive integer of from 1 to 4.

3. 1 - dicarbethoxymethylene - 2 - methyl-1,2-dihydroisoquinoline having the following formula:

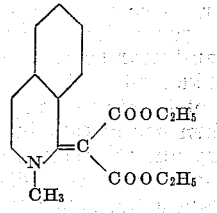

4. 1 - dicarbethoxymethylene - 2 - ethyl - 1,2-dihydroisoquinoline having the following formula:

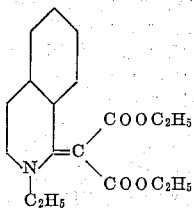

5. 1 - dicarbethoxymethylene - 2 - n - propyl-1,2-dihydroisoquinoline having the following formula:

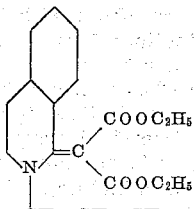

6. A process for preparing a 1-dicarbalkoxymethylene-2-alkyl-1,2-dihydroisoquinoline comprising condensing, in the presence of a tertiary organic amine which has an ionization constant greater than $10^{-5}$ at 25° C., an ester of malonic acid selected from those having the following general formula:

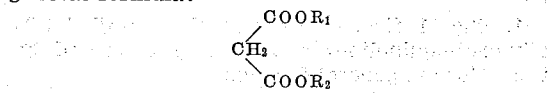

wherein R₁ and R₂ each represents an alkyl group, with a 1-alkyl-mercaptoisoquinoline alkyl quaternary salt selected from those having the following general formula:

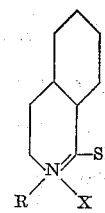

wherein R and R₃ each represents an alkyl group and X represents an anion.

7. A process for preparing a 1-dicarbalkoxymethylene-2-alkyl-1,2-dihydroisoquinoline comprising condensing, in the presence of a tertiary organic amine which has an ionization constant greater than $10^{-5}$ at 25° C., an ester of malonic acid selected from those having the following general formula:

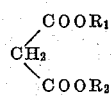

wherein R₁ and R₂ each represents a primary alkyl group of the formula $C_nH_{2n+1}$ wherein $n$ represents a positive integer of from 1 to 4, with a 1-alkylmercaptoisoquinoline alkyl quaternary salt selected from those having the following general formula:

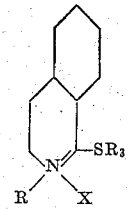

wherein R and R₃ each represents a primary alkyl group of the formula $C_nH_{2n+1}$ wherein $n$ represents a positive integer of from 1 to 4, and X represents an anion.

8. A process for preparing a 1-dicarbalkoxymethylene-2-alkyl-1,2-dihydroisoquinoline comprising condensing, in the presence of a trialkylamine which has an ionization constant greater than $10^{-5}$ at 25° C., an ester of malonic acid selected from those having the following general formula:

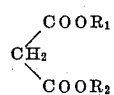

wherein R₁ and R₂ each represents a primary alkyl group of the formula $C_nH_{2n+1}$ wherein $n$ represents a positive integer of from 1 to 4, with a 1-alkylmercaptoisoquinoline alkyl quaternary salt selected from those having the following general formula:

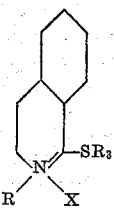

wherein R and R₃ each represents a primary alkyl group of the formula $C_nH_{2n+1}$ wherein $n$ represents a positive integer of from 1 to 4, and X represents an anion.

9. A process for preparing a 1-dicarbalkoxymethylene-2-alkyl-1,2-dihydroisoquinoline comprising condensing in an alcohol of the formula $C_nH_{2n+1}OH$ wherein $n$ represents a positive integer of from 1 to 4, in the presence of a trialkylamine which has an ionization constant greater than $10^{-5}$ at 25° C., an ester of malonic acid selected from those having the following general formula:

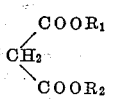

wherein R₁ and R₂ each represents a primary alkyl group of the formula $C_nH_{2n+1}$ wherein $n$ represents a positive integer of from 1 to 4, with a 1-alkylmercaptoisoquinoline alkyl quaternary salt selected from those having the following general formula:

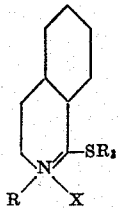

wherein R and R₃ each represents a primary alkyl group of the formula $C_nH_{2n+1}$ wherein $n$ represents a positive integer of from 1 to 4, and X represents an anion.

10. A process for preparing 1-dicarbethoxymethylene - 2 - methyl-1,2 - dihydroisoquinoline comprising condensing in ethyl alcohol, in the presence of triethylamine, diethyl malonate with 1-methylthioisoquinoline metho - p - toluenesulfonate.

11. A process for preparing 1-dicarbethoxymethylene-2-ethyl-1,2-dihydroisoquinoline comprising condensing in ethyl alcohol, in the presence of triethylamine, diethyl malonate with 1-methylthioisoquinoline etho-p-toluenesulfonate.

12. A process for preparing 1-dicarbethoxyethylene-2 - n - propyl-1,2-dihydroisoquinoline comprising condensing in ethyl alcohol, in the presence of triethylamine, diethyl malonate with 1-methylthioisoquinoline n-propo - p - toluene sulfonate.

FRANK L. WHITE.
LESLIE G. S. BROOKER.

REFERENCES CITED

The following references are of record in the file of this patent:

UNITED STATES PATENTS

| Number | Name | Date |
| --- | --- | --- |
| 2,080,049 | Kendall | May 11, 1937 |
| 2,108,484 | Hamer et al. | Feb. 15, 1938 |
| 2,340,882 | Kendall | Feb. 8, 1944 |

FOREIGN PATENTS

| Number | Country | Date |
| --- | --- | --- |
| 457,335 | Great Britain | Nov. 25, 1936 |
| 487,051 | Great Britain | June 14, 1938 |
| 489,335 | Great Britain | July 22, 1938 |
| 431,141 | Great Britain | June 24, 1945 |

OTHER REFERENCES

Mills et al., J. Chem. Soc. (London), vol. 121, page 2725 (1922).

Certificate of Correction

Patent No. 2,518,512 August 15, 1950

FRANK L. WHITE ET AL.

It is hereby certified that error appears in the printed specification of the above numbered patent requiring correction as follows:

Column 1, line 39, for that portion of the formula reading "$COOO_2$" read *$COOR_2$*; line 56, for that portion of the formula reading "$-SR_2$" read $-SR_3$;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*